Figure 1:
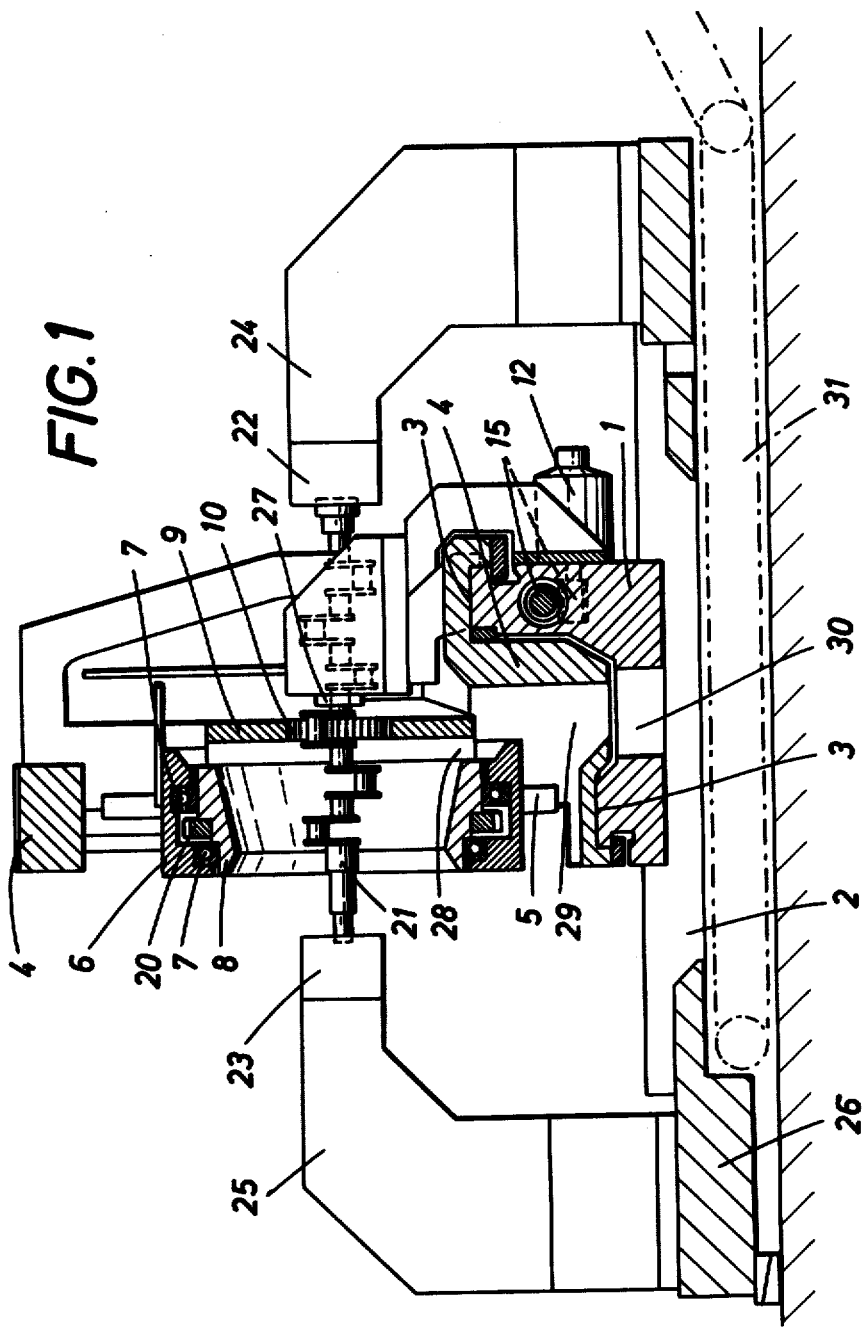

United States Patent [19]
Kralowetz et al.

[11] 3,880,025
[45] Apr. 29, 1975

[54] MACHINE TOOL FOR THE MACHINING OF SHAFTS

[75] Inventors: Bruno Kralowetz; Robert Obtresal, both of Steyr, Austria

[73] Assignee: GFM Gesellschaft fur Fertigungstechnik und Maschinenbau Aktiengesellschaft, Steyr, Austria

[22] Filed: May 22, 1974

[21] Appl. No.: 472,495

[30] Foreign Application Priority Data
June 27, 1973 Austria .............................. 5668/73

[52] U.S. Cl. ...................... 82/9; 90/11 R; 90/15 R
[51] Int. Cl. .............................................. B23b 5/18
[58] Field of Search ......... 90/15 R, 15.1, 11 R; 82/9

[56] References Cited
UNITED STATES PATENTS

| | | | |
|---|---|---|---|
| 847,426 | 3/1907 | Moll | 90/15 |
| 2,942,526 | 6/1960 | Maecker | 90/15.1 |
| 3,727,494 | 4/1973 | Rohs | 82/9 |

*Primary Examiner*—Leonidas Vlachos
*Attorney, Agent, or Firm*—Kurt Kelman

[57] ABSTRACT

The machine tool comprises a longitudinal guide, workpiece-holding means for holding a workpiece in a fixed position, in which the longitudinal axis of said workpiece is parallel to said longitudinal guide, a tool slide assembly, which is movable along said longitudinal guide and comprises a compound rest, which consists of two slides, which are movable relative to each other in directions which are normal to each other and transverse to said guide, an annular tool, which has inwardly facing cutting means and is carried by said compound rest and adapted to surround a workpiece held by said workpiece-holding means, means for revolving said tool around said workpiece, and means for coordinating the relative movements of said slides.

6 Claims, 5 Drawing Figures

MACHINE TOOL FOR THE MACHINING OF SHAFTS

This invention relates to a machine tool for the machining of shafts, particularly crankshafts, comprising a tool slide assembly, which is guided parallel to the longitudinal axis of the workpiece and carries an inwardly directed annular tool, which revolves around the stationary workpiece. Such machine tools consist in most cases of milling machines but may also consist of grinding machines and the like, to which the statements made in connection with milling machines are analogously applicable.

So-called internal milling cutters are known, which distinguish mainly in that they may be used in machines designed for a high-rigidity of the means for mounting and driving the tools so that cermet tips may be used since the high cutting speeds of which they are capable may be utilized. Compared to an external milling cutter, an internal milling cutter has the advantage that it enables a more favorable drive arrangement because the drive is transmitted to the milling cutter on the outside of the flight circle of the teeth and at a diameter which is larger than that of said flight circle. It will be understood that an internal milling cutter or the like may be used only for machining the outside surface of workpieces around the cross-section of which a circle can be circumscribed which is smaller than the inside diameter of the milling cutter. In most cases, a workpiece is formed with an outside surface which is circular in section although non-circular sections may be obtained if the radius of curvature of the cross-section is smaller than the radius of the flight circle of the teeth. Because it comprises a large number of cutting edges combined in a single tool, the internal milling cutter is particularly suitable for cutting deep recesses. For this reason it was obvious to use an internal milling cutter also to make crankshafts. Owing to its irregular shape and its low rigidity, it is fairly difficult to machine a crankshaft, which requires an eccentric machining to a large extent. For these reasons, internal milling has recently been preferred to external milling in the machining for crankshafts.

In the previously known internal milling machines, the workpiece is rotated and the milling cutter is guided on a slide so that the desired cross-sectional is imparted to the crankshaft. The slide movement must be controlled by a template so that, e.g., eccentric crankpins can be milled. Such a copying or template control means are fairly complicated and expensive and in case of a change in set-up involve long standstill times of the machine. Another disadvantage of this internal milling machine resides in that the crankshaft must revolve during the cut and cannot be gripped in a fixed position. This requirement involves additional drive means and shorter edge lives of the tools. Besides, the crankshaft must be indexed so that the same initial position is provided for the machining of each crankpin. This requires special transmissions. The indexing is particularly important to ensure that the crankpins will have exactly the required angular position around the axis of the crankshaft.

There are other internal milling machines, in which the crankshaft is gripped in a fixed position and the tool revolves around the crankshaft. For this purpose the milling cutter is mounted in an eccentric member and the eccentricity of said eccentric member and the inside diameter of the tool are selected so that the cutting edges machine the pin to desired diameter during one revolution of the eccentric. To enable a setting of the tool to the center of the crankpin and a change to other crankshaft throws, the milling cutter must be mounted in an adjustable slide. That machine affords the advantage that the crankshaft is stationary during the cut but the machine enables a milling only of pins having one predetermined diameter. The pin diameter depends on the radius of the eccentric member and on the inside diameter of the milling cutter. Because a change of the eccentric member and of the radius of the flight circle of the cutter teeth would involve substantial changes or structural alterations, it will not be possible to mill crankshaft differing in diameter with a machine arrangement which has been provided. For the same reason, only circular cross-sections can be formed rather than cross-sections composed of arcs of circles having different radii. Another disadvangate of that internal milling cutter resides in that a milling of the several crankpins which are angularly spaced requires not only an axial displacement of the crankshaft relative to the stationary milling cutter but also a rotation of the crankshaft so that the preiphery of the crankshaft must also be indexed.

It is an object of the invention to eliminate these disadvantages and to provide a machine tool which is of the kind described first hereinbefore and with which shafts, particularly crankshafts, of any shape and any diameter, can be machined rapidly and accurately without need for any resetting work, complicated copying or template control means or a time-consuming indexing of the crankshaft.

This object is essentially accomplished by the invention in that the tool slide assembly comprises a compound rest, which comprises two slides, which are displaceable transversely to the longitudinal axis of the workpiece and normal to each other, and the relative movements between said slides are coordinated preferably by numerical circular path control means. Because the tool is mounted on a longitudinally slidable compound rest, the tool can be moved to any desired point in the three-dimensional space adjacent to the tracks for the tool slide assembly. When it is desired to machine, e.g. a crankpin of a crankshaft, the entire tool slide assembly is displaced along the axis of the crankshaft until the desired length position has been reached. The compound rest now permits of a movement of the tool in a plane which is transverse to the axis of the workpiece. By the circular path means for controlling the compound rest, the center of the tool can be caused to describe a circle having any desired radius at any desired distance and in any desired direction from the axis of the workpiece so that a crankpin may be formed which has an exactly determined position and size. For this operation, the circular path control means require and input consisting of only three data, namely, the eccentricity of the pin to be formed, the diameter of said pin, and its angular position. There is no need for templates or copying means or for an indexing of the crankshaft, and the latter need not be axially displaced nor rotated. It will also be possible to make shafts having a single step, and if the circular path control means is properly programmed it is possible to form cross-sections which deviate from an exact circle and consist of consecutive arcs of circles. The machine tool according to the invention distinguishes by simplicity and versatility. Additional advantages reside in the stability of the machine and the accuracy of its work.

It will be particularly favorable if the compound rest comprises a horizontally displaceable cross slide and the tool slide, which is mounted on said cross slide and slidable along vertical guides. The horizontal and vertical guides of the slides can easily be related to the system of circular path control means so that no difficulties are involved in the control. This arrangement results also in a relatively simple structure of the compound rest and of the means for driving the two slides.

To enable a support of the workpiece during the machining even closely beside the actual tool, it is a feature of the invention that the tool slide assembly carries an additional chuck or the like, which is adjustable relative to the tool slide assembly in the longitudinal direction of the workpiece. The chuck is longitudinally slidable together with the tool slide assembly and for this reason can embrace the crankshaft always directly beside the portion being machined. The relative movement between the chuck and the tool slide is required for an adjustment of the distance between the tool and a workpiece surface where the workpiece can be supported An embodiment of the invention is shown diagrammatically and by way of example on the accompanying drawing, in which FIG. 1 is a view partly in a section on a plane taken through the longitudinal axis of a milling machine according to the invention, FIG. 2 is an elevation showing the machine viewed in the longitudinal direction of the workpiece, and FIGS. 3 to 5 are strictly diagrammatic views illustrating respectively the milling of crankpins, of a stepped shaft, and of a cross-section composed of arcs of circles.

Figure 2:
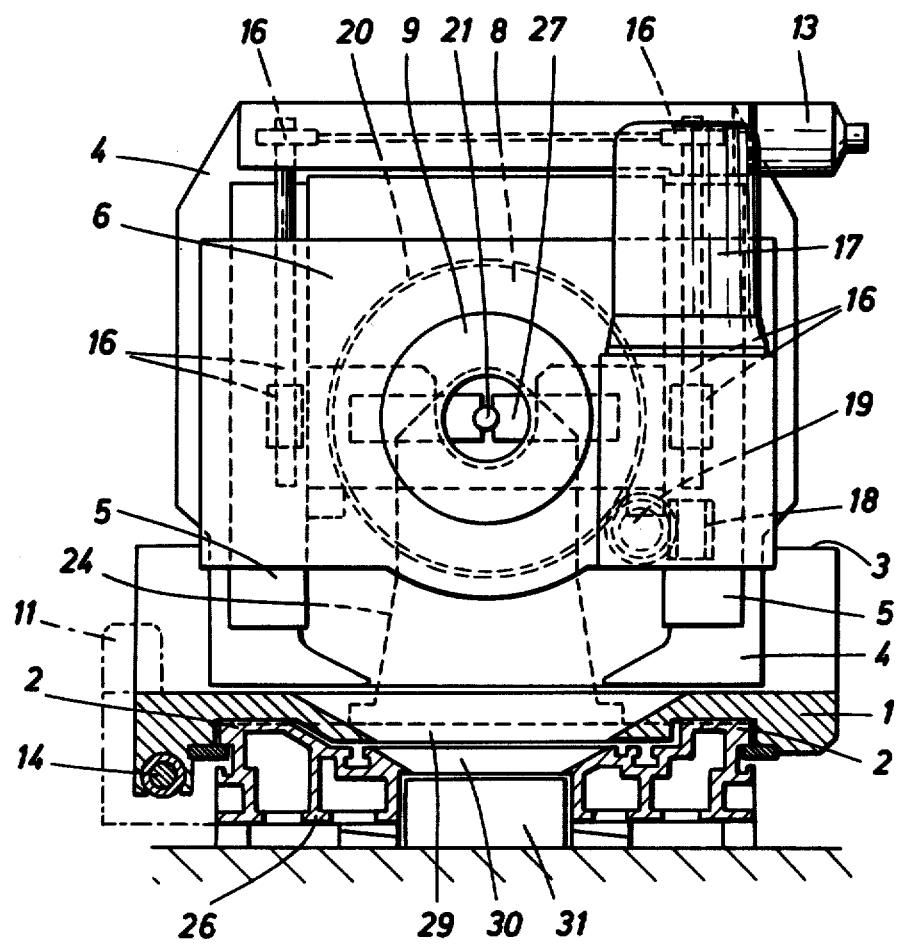
Figure 3:
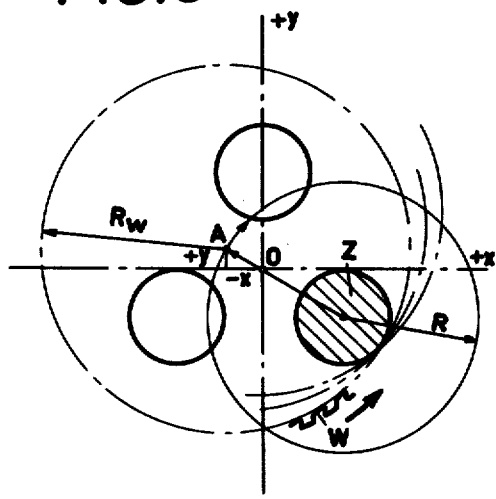

The milling machine shown in FIGS. 1 and 2 comprises a main slide 1, which is movable on rails 2 in the longitudinal direction of the machine. The main slide 1 carries a compound rest, which consists of a cross slide 4, which is slidable on horizontal guides 3, and of a tool slide 6, which is vertically displaceable on the cross slide in guides 5. A tool drum 8 is rotatably mounted in the tool slide 6 by means of rolling element bearing 7 and at one of its ends carries a milling cutter 9. The milling cutter 9 is annular and has inwardly directed cutting edges 10. Motors 11, 12, 13 for driving the respective slides are operatively connected thereto by transmissions and screws 14, 15, 16. A motor 17 for driving the tool 9 imparts a rotation to the milling cutter in that a worm gearing 18 operatively connected to the motor 17 has a pinion 19, which is in mesh with a gear 20 of the tool drum 8. The workpiece consisting, e.g., of a crankshaft 21, is held stationary during the milling operation and for this purpose is gripped in chucks 22, 23 of two gripping heads 24, 25. The gripping head 25 is longitudinally displaceable on a machine bed 26 so that the milling machine can be adjusted to different workpiece lengths. To support the crankshaft 1 during the miling operation, and additional chuck 27 is mounted on the main slide 1 and is adjustable relative to the latter and may be used to hold the crankshaft in position closely beside the tool. The chips dropping into the tool drum 8 during the milling operation are thrown outwardly by centrifugal force through passages 28 in the drum 8 and together with the chips which drop outside the drum fall through a suitable passage 29 in the cross slide 4 and an opening 30 of the main slide 1 and through the machine bed onto a chip conveyor 31, which carries the chips away from the milling machine. When it is desired to grip the crankshaft 21, the entire main slide must be laterally displaced to such an extent that the workpiece can be moved between the gripping heads from above by means of a crane or the like. When the crankshaft has been gripped in position, the tool is adjusted in the longitudinal direction of the workpiece. This may be accomplished, e.g., electrically under control of cams and limit switches or of numerical control means. During that longitudinal displacement of the main slide, the center of the tool moves in the longitudinal axis of the workpiece so that the annular tool can surround the crankshaft. When the desired length position has been reached, the corresponding portion of the shaft is milled. For this purpose the annular milling cutter must moved around the crankshaft. During that operation, the tool center describes a closed circle, which during the milling of a mainshaft portion is centered on the workpiece axis and during the milling of crankpins is eccentric with respect to the workpiece axis. To enable such circular movement of the tool around the workpiece, the movements of the cross slide and of the tool slide are coordinated by circular path numerical control means. These simple, commercially avialable circular path control means are sufficient for controlling a movement of the tool along circles having any desired diameter and at any desired distance from the workpiece axis so that it is possible to mill not only shafts differing in diameter but also eccentric pins and cross-sections consisting of consecutive arcs of circles. It will be sufficient if the input to the circular path numerical control means consists of three data, namely, the diameter to be milled, the angular position of the shaft portion to be milled, and its eccentricity.

The motion of the milling cutter will now be explained with reference to three examples illustrated in FIGS. 3 to 5. By means of the compound rest which is controlled by circular path control means, the center of the tool can be moved along arcs of a circle at any desired distanace from the origin of coodinates, which coincides with the workpiece axis. When it is desired to mill an eccentic crankpin Z according to FIG. 3, the tool must first be centered on the longitudinal axis 0 of the workpiece and then be moved to such a length position that the milling cutter and the crankpin lie in the same transverse plane. To adjust the depth of the recess, the tool center is then moved away from the workpiece axis 0 in a direction which corresponds to the angular position of the crankpin until the cutter edges of the teeth reach the desired surface of the pin. As a result, the tool center moves in the respective cross-sectional plane along the straight line which connects the pin center and the workpiece axis. The path control means will cause the tool center to move to this initial position A if the coordinates $-x$ and $=y$ are fed into the path control means. From here, the tool center moves around the center of the pin Z along a circle having a radius R, which corresponds to the distance between the pin center and the initial point A. The teeth W of the tool define and inscribed circle having a radius $R_w$. During the circular movement of the tool center, the tool mills the pin to a circular shape by enveloping cuts. When the tool center has performed this circular movement, the tool center returns to its original position on the workpiece axis 0. The tool can now be displaced further along the workpiece axis to a position for milling another crankpin.

Figure 4:
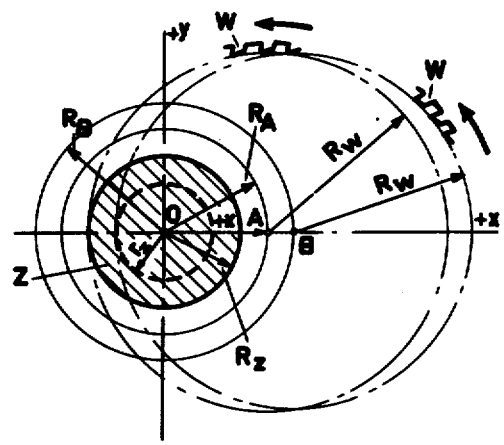
Figure 5:
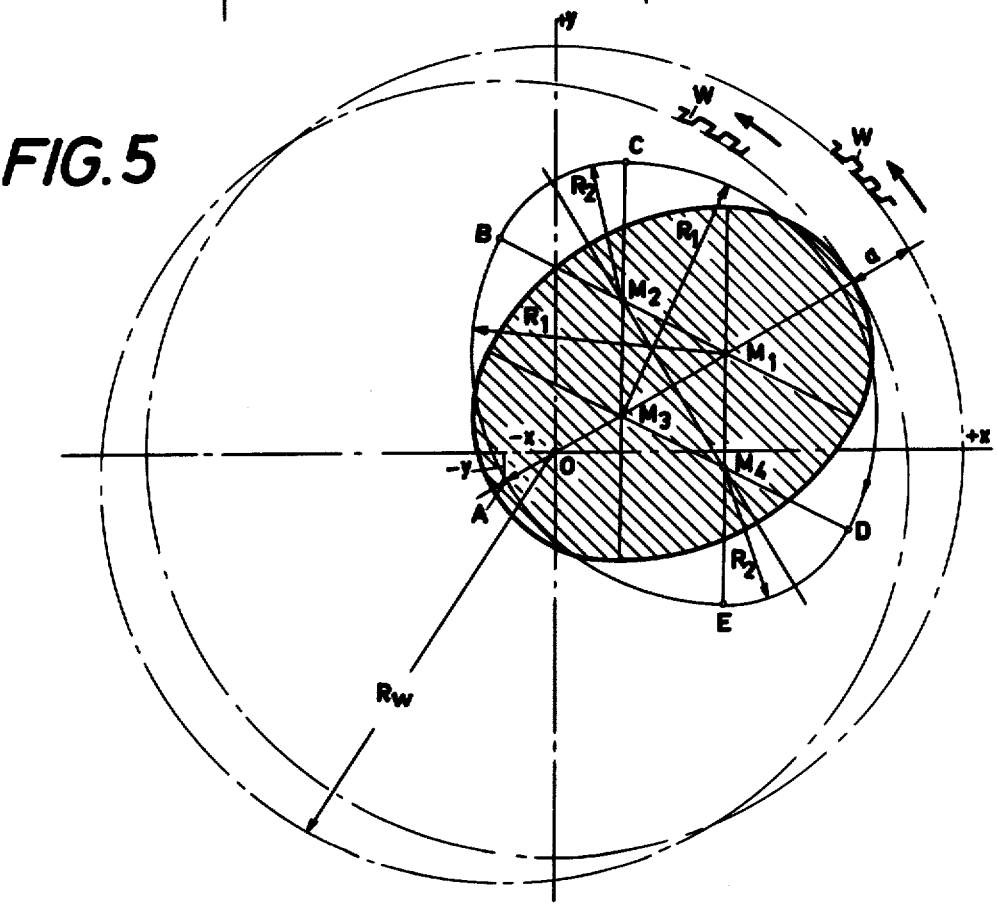

FIG. 4 illustrates the milling of pins which are centered on the axis of the workpiece and differ in diameter. The workpiece centered on the workpiece axis 0 is also moved in the longitudinal direction to the desired position and is then displaced so that its center moves along the x-axis away from the workpiece axis until the teeth W of the tool have reached the desired pin surface. The tool center is now at point A and to mill the pin describes around the axis 0 a circle having a radius $R_A$. This results in a pin having a radius $R_Z$. When the tool center has returned to the initial point A, the pin has been completely milled and the tool center is moved back into the workpiece axis 0. When it is nw desired to make a pin which is smaller in diameter, the centered tool moves to the new length position and the tool center is then moved from 0 along the X axis to the new initial point B, which is disposed further outwardly. From that point the tool center is moved around the workpiece axis 0 on a circle having the radius $R_B$. When the circular movement has been performed, a new pin having a smaller radius $r_z$ has been milled.

FIG. 5 illustrates the milling of an ellipsoid cross-section having an outside cross-section which is composed of consecutive arcs of circles. The tool has again been moved to the correct initial position and its center conincides with the orgin 0 of coordinates. The cutting edges B of the tool lie on a circle which is centered on the origin 0 and has the radius $R_W$. To recess the workpiece, the tool center is now moved from the origin 0 by the distance $a$ to the initial point A, which is defined by the coordinates $<x, -y$. The flight circle described by the cutting edges has thus also been displaced by the distance $a$ and has reached the desired surface of the workpiece. The tool center non begins to revolve from the initial point A along arcs of circles. The tool center moves first from A to B and by that movement describes an arc of a circle having a radius $R_1$ and centered on point $M_1$, then moves from B to C along an arc of a circle centered on point $M_2$ and having a radius $R_2$, from C to D along an arc of a circle centered on point $M_3$ and having the radius $R_1$, from D to E along an arc of a circle centered on point $M_4$ and having the radius $R_2$, and finally from E back to A along an arc of a circle centered on point $M_1$ and having the radius $R_1$. From the initial point A, the tool center returns to the origin 0. During one revolution the tool has thus milled an ellipsoid cross-section, which is composed of four sections consist of arcs of circles.

What is claimed is:

1. A machine tool for the machining of shafts, which comprises
    a longitudinal guide,
    workpiece-holding means for holding a workpiece in a fixed position, in which the longitudinal axis of said workpiece is parallel to said longitudinal guide,
    a tool slide assembly, which is movable along said longitudinal guide and comprises a compound rest, which consists of two slides, which are movable relative to each other in directions which are normal to each other and transverse to said guide,
    an annular tool, which has inwardly facing cutting means and is carried by said compound rest and adapted to surround a workpiece held by said workpiece-holding means,
    means for revolving said tool around said workpiece, and
    means for coordinating the relative movements of said slides.

2. A machine tool as set forth in claim 1, which is adapted to machine crankshafts.

3. A machine tool as set forth in claim 1, which comprises circular path numerical control means for coordinating the relative movements of said slide.

4. A machine tool as set forth in claim 1, in which said compound rest comprises
    a horizontally displaceable cross slide having a vertical guide, and
    a tool slide carrying said tool and slidably mounted in said vertical guide.

5. A machine tool as set forth in claim 1, in which said tool slide assembly carries an additional support, which is adapted to support a workpiece held in said fixed position and is movable along said guide relative to said tool slide assembly.

6. A machine tool as set forth in claim 1, in which said additional support consists of a chuck.

* * * * *